(12) United States Patent
Albert

(10) Patent No.: US 6,807,341 B2
(45) Date of Patent: Oct. 19, 2004

(54) ADJUSTABLE TEMPERATURE COMPENSATING PACKAGE FOR OPTICAL FIBER DEVICES

(75) Inventor: Jacques Albert, Quebec (CA)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 10/662,882

(22) Filed: Sep. 16, 2003

(65) Prior Publication Data

US 2004/0156587 A1 Aug. 12, 2004

Related U.S. Application Data

(63) Continuation of application No. 10/003,525, filed on Dec. 6, 2001, now abandoned.

(51) Int. Cl.[7] .............................................. G02B 6/34
(52) U.S. Cl. ................................... 385/37; 385/137
(58) Field of Search ......................... 385/37, 134, 137

(56) References Cited

U.S. PATENT DOCUMENTS

| | | | |
|---|---|---|---|
| 5,042,898 A | | 8/1991 | Morey et al. |
| 5,914,972 A | | 6/1999 | Siala et al. |
| 5,926,599 A | | 7/1999 | Bookbinder et al. |
| 5,978,539 A | | 11/1999 | Davies et al. |
| 5,991,483 A | * | 11/1999 | Engelberth .................. 385/37 |
| 6,112,553 A | | 9/2000 | Poignant et al. |
| 6,115,520 A | | 9/2000 | Laskowski et al. |
| 6,278,819 B1 | * | 8/2001 | Reddy .......................... 385/37 |
| 6,374,015 B1 | * | 4/2002 | Lin ............................. 385/37 |
| 6,449,402 B1 | * | 9/2002 | Bettman et al. .............. 385/15 |
| 6,490,394 B1 | | 12/2002 | Beall et al. |
| 6,498,891 B1 | * | 12/2002 | Montesanto et al. ........ 385/134 |
| 2002/0141700 A1 | | 10/2002 | Lachance et al. |
| 2002/0150335 A1 | * | 10/2002 | Lachance et al. ............. 385/37 |

FOREIGN PATENT DOCUMENTS

| | | |
|---|---|---|
| EP | 1 168 014 A2 | 1/2002 |
| WO | WO 00/54082 | 9/2000 |

\* cited by examiner

*Primary Examiner*—John D. Lee
*Assistant Examiner*—Sarah U Song
(74) *Attorney, Agent, or Firm*—Moser, Patterson & Sheridan, L.L.P.

(57) ABSTRACT

An assembly for providing thermal compensation to a fiber optical device is described. The optical fiber device is secured in a support structure made of a material having a negative coefficient of thermal expansion. The securing means located at on end of the support structure is made of a material having a positive coefficient of thermal expansion. The securing means is also adjustable lengthwise so as to provide longitudinal adjustment to the tension on the optical fiber device. By selecting the appropriate materials and dimensions the assembly can exactly compensate for the thermal dependency of the optical device with an overall length much smaller than assemblies based on materials with dissimilar positive CTEs.

18 Claims, 2 Drawing Sheets

ADJUSTABLE TEMPERATURE COMPENSATING PACKAGE FOR OPTICAL FIBER DEVICES

CROSS REFERENCE TO RELATED APPLICATION

This application is a continuation of U.S. patent application Ser. No. 10/003,525 filed Dec. 6, 2001 now abandoned.

FIELD OF THE INVENTION

This invention relates to fiber optic devices such as fiber gratings and more particularly to a package and system to compensate for the thermal dependence of such devices.

1. Background

The Bragg effect is employed in optical communications systems for, amongst other things, wavelength selective filtering. In this implementation the filter is used in add/drop wavelength applications and in multiplexing and demultiplexing functions. Bragg filters are also used in Mach-Zehnder interferometer applications for various optical communication related functions.

A grating is a series of perturbations in an optical wave guide precisely positioned according to a desired wavelength effect. It is known that such gratings are thermally dependent wherein the spacing between perturbations and the refractive index of the waveguide materials actually increase with increasing temperature. This temperature dependence, if not compensated for, will change the effective central wavelength of the grating as a function of operating temperature.

2. Prior Art

There are known methods of incorporating thermal compensation strategies into fiber optical devices. The first such method to be described here involves a package consisting of a holding tube and a pair of threaded, smaller tubes designed to fit within the holding tube. The holding tube is made of a material that has a different coefficient of thermal expansion (CTE) than that of the threaded tubes. The grating is fixed to the smaller tubes in such a way that it is strained by an amount designed to compensate for its temperature dependence when the temperature changes. Strain arises because of the different coefficients of thermal expansion of the two kinds of tubes. U.S. Pat. No. 5,914,972 which issued Jun. 22, 1999 to Siala et al. describes one such package. U.S. Pat. No. 5,042,898 which issued Aug. 27, 1991 to Morey et al. describes a similar arrangement and includes discussion regarding the thermal dependence of a grating.

A second solution consists of fixing the grating, whether it be a fiber Bragg grating or a Mach-Zehnder interferometer, to a substrate and then gluing the substrate to a bi-metal plate. The bi-metal plate is composed of two materials, each with a different coefficient of thermal expansion, sandwiched in such a way that when the temperature changes the bi-metal plate bends. The bending of the bi-metal plate induces a strain on the substrate affixed to it which is proportional to the length of the bi-metal plate. It is this strain which compensates for the temperature dependence of the grating. U.S. Pat. No. 5,978,539 which issued Nov. 2, 1999 to Davis et al. describes a variant of this concept.

A third approach consists of fixing the fiber Bragg grating or Mach-Zehnder interferometer to a special substrate that has a negative coefficient of thermal expansion of exactly the correct value so that it shrinks by just the right amount to compensate for the thermal variation of the spectral response of the device. U.S. Pat. No. 5,926,599 which issued Jul. 20, 1999 to Bookbinder et al. gives one example of this approach.

There is a further approach described in International application WO 00/54082 published Sep. 14, 2000 to Maaskant et al. that describes a shaped substrate that is designed to bend in a controlled fashion in response to temperature variations. The fiber device is attached to the substrate in such a way that the bending action changes the amount of tension on the fiber device in response to temperature changes.

Another compensation technique is described in Applicant's co-pending U.S. application Ser. No. 09/985,041 filed Nov. 1, 2001 the contents of which are incorporated herein by reference. The compensation technique of the earlier application is based on a modification of the aforementioned bi-metal approach whereby the use of glue to hold the substrate to the bi-metal strip is rendered unnecessary. According to this prior design a bi-metal element comprising two components is used. Instead of gluing a bi-metal plate to the fiber device substrate, the substrate itself is used as the first component of the bi-metal element and is shaped in such a way that the second component of the bi-metal element forces it to curve by pushing against it when subject to a temperature increase. The curvature of the first component of the bi-metal element changes the strain state of the fiber attached to it. The main component of the force acting to curve the fiber device is therefore held mechanically instead of relying on the sheer strength of a glue.

In the aforementioned solution the combination of materials with different coefficients of thermal expansion effectively attain a net negative CTE of a generally proper size. The net CTE obtained is a function of the CTE of the individual materials and of their sizes. Therefore it is adjustable. As indicated previously an alternative approach consists of fixing the fiber device to a material with a negative CTE.

The solution based on materials with different CTE works well but the package needs to be either significantly longer than the fiber device it is designed to compensate or involves the bending of interconnected parts, which is often difficult to implement. Access to the fixing points (glues or solder) is also difficult. Solutions based solely on negative CTE materials solve these problems but introduce an additional one in the sense that the effective CTE is an inherent property of the materials and thus it is impossible to incorporate a fine adjustment for different optical fiber devices. Furthermore, the negative CTE of such materials tends to vary from batch to batch.

SUMMARY OF THE INVENTION

The present invention consists of using a material with a CTE that is excessively negative and to combine it with a positive material with adjustable length in such a way as to provide an adjustable, negative CTE. In this way, the length of the package need not be much longer than the device to be compensated and most of the advantages associated with using negative CTE materials are preserved while avoiding their main disadvantage (lack of adjustability).

Therefore, in accordance with a first aspect of the present invention there is provided a temperature compensating package for an optical fiber device comprising: a support structure of material having a negative CTE; and securing means located in the support structure for securing opposed ends of an optical fiber device, at least one of the securing means being of a material having a positive CTE and adjustable lengthwise.

In accordance with a second aspect of the present invention there is provided a method of providing thermal compensation to an optical fiber device comprising: providing a support structure for the optical fiber device, the support structure being of a material having a negative coefficient of thermal expansion and having securing means at each end, at least one of the securing means being of a material having a positive coefficient of thermal expansion and adjustable lengthwise; adjusting the at least one securing means to establish a base thermal compensation value; and securing the optical fiber device to the securing means within the support structure.

In accordance with a third aspect of the present invention there is provided a fiber optical device assembly with associated thermal compensation comprising: an optical fiber having a fiber optical device therein; a support structure of a material having a negative coefficient of thermal expansion through which the optical fiber extends; securing means in each end of the support structure and securing the optical fiber on opposite ends of the optical fiber device, at least one of the securing means being of a material having a positive coefficient of thermal expansion and being adjustable longitudinallly of the optical fiber.

BRIEF DESCRIPTION OF THE DRAWINGS

The invention will now be described in greater detail with reference to the attached drawings; wherein.

DETAILED DESCRIPTION OF THE INVENTION

Figure 1:
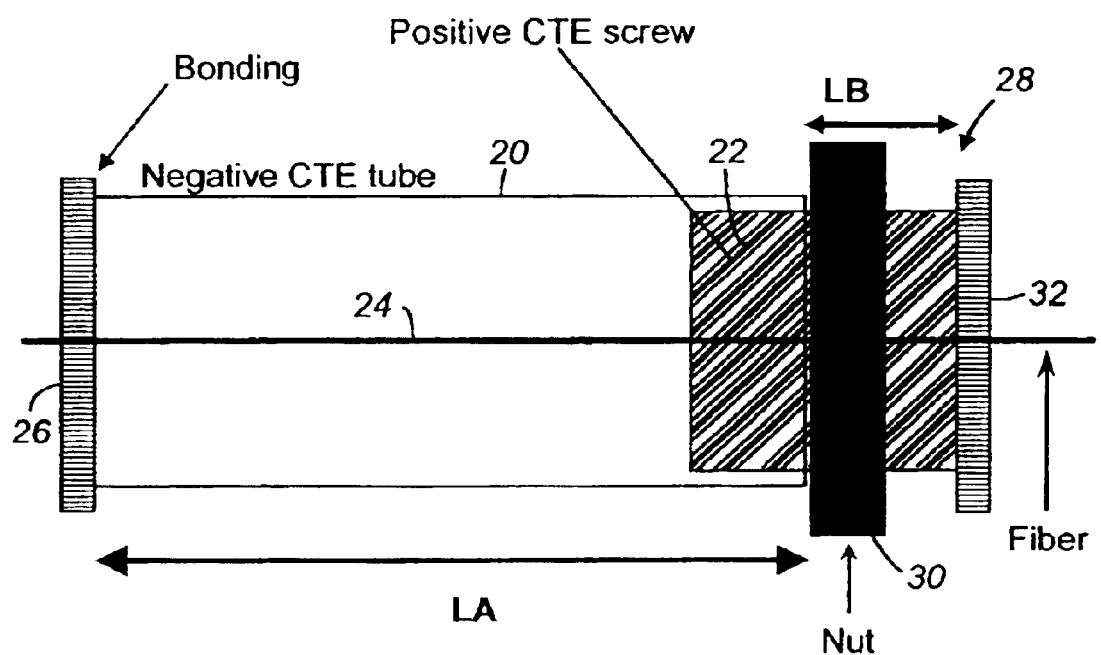
FIG. 1 shows the compensating package according to one aspect of the present invention.
Figure 2:
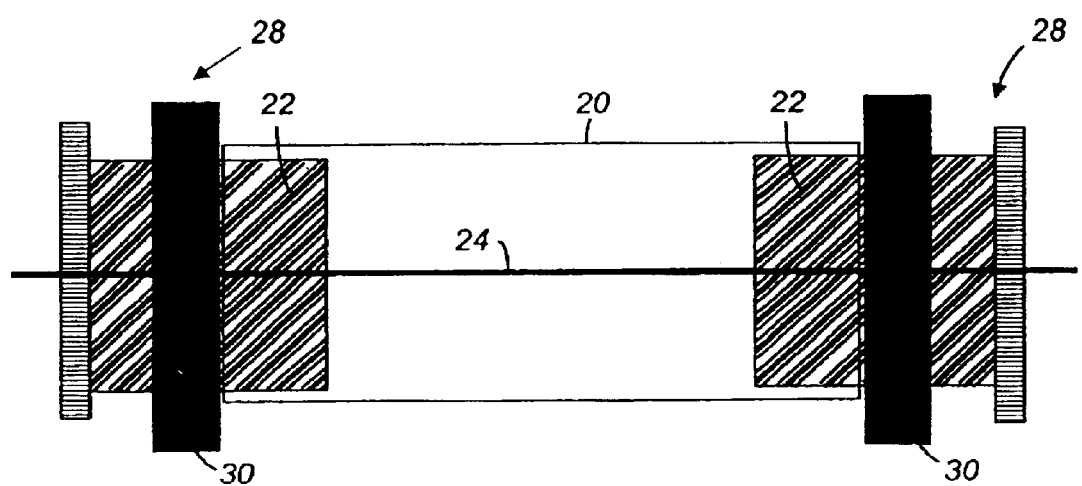
FIG. 2 shows a second embodiment of the compensating package.

The solution, according to the present invention, is illustrated in FIG. 1. In this package the support structure 20 is of a material having a negative coefficient of thermal expansion. A material such as alumino-silicate glass ceramic may be used, and in a preferred embodiment the support structure is a alumino-silicate glass ceramic tube. The actual shape of the support structure is not critical as long as it has a cross section which is large enough to accommodate at least adjustment means. In FIG. 2 the adjustment means 28 is a screw 22 made of a material having a positive CTE. Brass is one possible material for the adjustment means 28.

In operation an optical fiber device 24 extends through the supporting structure and is secured at one end by securing means 26 which is attached to one end of the aluminosilicate glass ceramic tube. At the opposite end of the tube adjustment means 28 is also used as a securing means. The fiber 24 is held to securing means 26 by suitable means such as an adhesive or epoxy.

Adjustment and securing means 28 comprises screw portion 22 with a complimentary nut 30 which threadingly engages screw 22. Fiber 24 is secured to screw 22 at end 32 again using an appropriate adhesive.

It will be apparent to one skilled in the art that by rotating nut 30 relative to screw 22 the nut facing on the end of tube 20 will alter the effective length of the adjustment and securing means 28 and thereby adjust the tension on fiber 24.

The tube of FIG. 1 has a negative CTE of value -A and a length LA which signifies the length of the package. The adjustment and securing means 28 has a positive CTE of value B. As shown in FIG. 1 a length of screw 22 protrudes from a tube by a length LB. The net CTE of the package of FIG. 1 is given by:

$$\text{net } CTE = (B \times LB - A \times LA)/LB + LA.$$

As an example, using a known ceramic for tube 20 and a brass screw 28, then $A=-80\times10^{-7}/°$ C. and $B=19\times10^{7}/°$ C. In this example the known ceramic could be one of two which are commercially available: NEX-1 ceramic from Ohara (Japan), or CERSAT N-80 from Nippon Electric Glass (Japan). CERSAT N-80 has the CTE listed as A above. Setting LA=20 mm, then, in order to get a net CTE of $-75\times10^{-7}/°$ C., LB must be equal to 1.06 mm. This yields a total package length of about 21 mm. If the required CTE is $-72\times10^{-7}/°$ C. then LB would be adjusted to 1.76 mm.

It will be apparent to one skilled in the art that this provides for fine tuning of the CTE. Furthermore, the sensitivity of the fine tuning based on the protruding length of the screw can be adjusted up or down by using a screw material of larger or smaller positive CTE value. Further, the presence of the screw allows for the fine tuning of the central wavelength of the fiber Bragg grating by adjusting the tension slightly but not so much as to change the CTE significantly. Obviously, some pretensioning of the fiber to a value close to the desired value of the given temperature is applied since the wavelength tuning requires changing the length LB slightly.

As is known the actual CTE of negative CTE materials available varies from batch to batch by a few parts in $10^{-7}$ and the necessary negative CTE needed for a variety of fiber devices also varies by the same amount. For instance, material with a nominal CTE of $-70\times10^{-7}/°$ C. was found to under compensate the thermal drift of the Bragg wavelength of FBGs by +1 pm/° C. while a similar material with a CTE of $-80\times10^{-7}/°$ C. over compensates the same FBG by -2.3 pm/° C. Finding the right material for the fiber device type proves to be impossible. The system described herein provides adjustability of the negative CTE in a range which extends from the base value of the tube material (support structure) to positive values limited only by the length of the whole device. In general, a very short length of protruding screw material will be needed to achieve most design goals. For instance, for a tube having a CTE of $-80\times10^{-7}/°$ C. and a grating length of 19 mm the extra length of brass screw needed to achieve a CTE of $-75\times10^{-7}/°$ C. is 1 mm. By comparison, a package based on the two positive materials as glass and brass needs to be 43 mm long.

It will also be apparent to one skilled in the art that for certain applications it is possible to have securing means with length adjustment at both ends of the support structure 20 (see FIG. 2). Further, it is within the scope of the present invention to use adjustment screws at opposite ends of the support having different CTE values if necessary in order to obtain an particular net CTE. Although brass is identified in the foregoing as a material with a positive CTE and aluminosilicate glass ceramic is identified as a material with a negative CTE it will be apparent to one skilled in the art that other materials of each type can be used. For example, aluminum could be used instead of brass.

While particular embodiments of the invention have been described and illustrated it will be apparent to one skilled in the art that numerous changes can be made to the basic concept. It is to be understood that such changes will fall within the full scope of the invention as defined by the appended claims.

What is claimed is:

1. A temperature compensating package for an optical fiber device comprising:

a support structure of a material having a negative coefficient of thermal expansion (CTE); and securing means located in the support structure for securing opposed ends of an optical fiber device passing therethrough, at least one of said securing means being of a material having a positive CTE and adjustable lengthwise.

2. A temperature compensating package as defined in claim 1 wherein said at least one securing means has a threaded screw portion and a complementary nut portion.

3. A temperature compensating package as defined in claim 1 wherein said support structure is an alumino-silicate glass ceramic tube.

4. A temperature compensating package as defined in claim 1 wherein said at least one securing means is a metal with relatively high CTE.

5. A temperature compensating package as defined in claim 1 wherein said at least one securing means is a metal with relatively high CTE.

6. A temperature compensating package as defined in claim 1 having securing means that are adjustable lengthwise at each end of said support structure.

7. A temperature compensating package as defined in claim 6 wherein said securing means have different positive CTE values.

8. A method of providing thermal compensation to an optical fiber device comprising:

providing a support structure for said optical fiber device, said support structure being of a material having a negative coefficient of thermal expansion and having securing means at each end, at least one of said securing means being of a material having a positive coefficient of thermal expansion and adjustable lengthwise;

adjusting said at least one securing means to establish a base thermal compensation value; and securing said optical fiber device to said securing means within said support structure.

9. The method as defined in claim 8 wherein said at least one securing means has a threaded portion and a complementary nut portion whereby rotation of said nut relative to said threaded portion adjusts tension on said optical fiber device.

10. The method as defined in claim 8 wherein said optical fiber device is a fiber grating.

11. The method as defined in claim 10 wherein said support structure has a negative coefficient of thermal expansion which is in excess of that which is required to compensate for thermal dependence of said optical device.

12. A fiber optical device assembly with associated thermal compensation comprising:

an optical fiber having a fiber optical device therein;

a support structure of a material having a negative coefficient of thermal expansion through which said optical fiber extends;

securing means in each end of said support structure, said securing means securing said optical fiber on opposite ends of said optical fiber device, at least one of said securing means being of a material having a positive coefficient of thermal expansion and being adjustable longitudinally of said optical fiber.

13. The fiber optical device assembly according to claim 12 wherein said at least one securing means comprises a threaded portion and a complementary nut portion wherein rotation of said nut on said threaded portion adjusts tension on said optical fiber device.

14. The fiber optical device assembly according to claim 13 wherein said support structure is an alumino-silicate glass ceramic tube.

15. The fiber optical device assembly according to claim 14 wherein said at least one securing means is made of a material with a relatively high CTE.

16. The fiber optical device assembly according to claim 14 wherein said at least one securing means is made of a material with a relatively high CTE.

17. The optical device assembly according to claim 12 wherein said optical fiber device is a fiber grating.

18. The optical device according to claim 15 wherein said at least one securing means is used to fine tune thermal compensation of said optical device.

* * * * *